Oct. 11, 1966   M. S. WITHERS   3,277,959
PLASTIC TUBE HEAT EXCHANGER AND PROCESS OF MAKING
Filed Aug. 12, 1964   5 Sheets-Sheet 1

INVENTOR
MICHAEL S. WITHERS

BY *Herbert M. Wolfson*
ATTORNEY

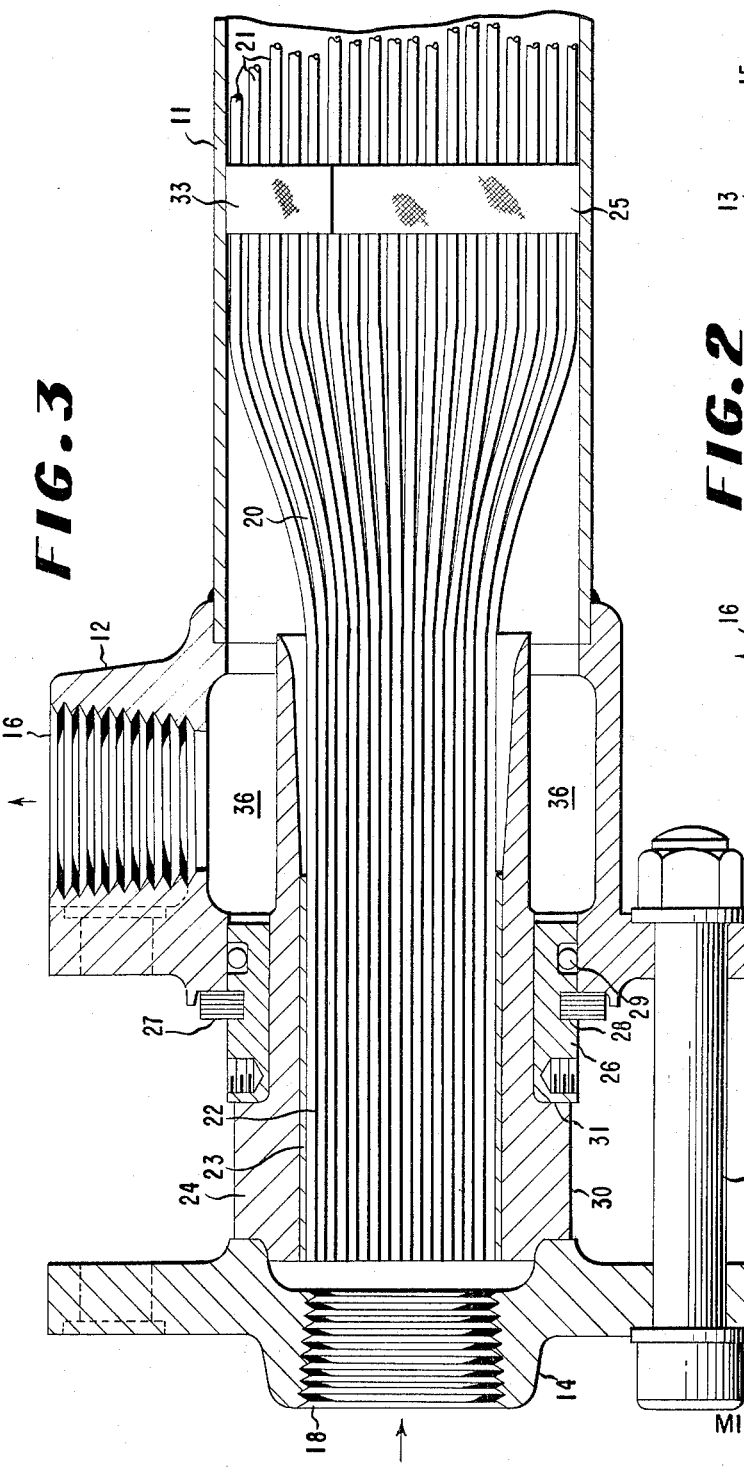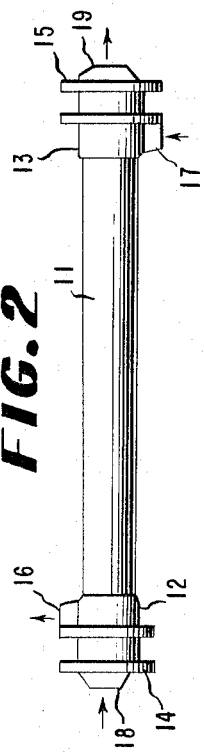

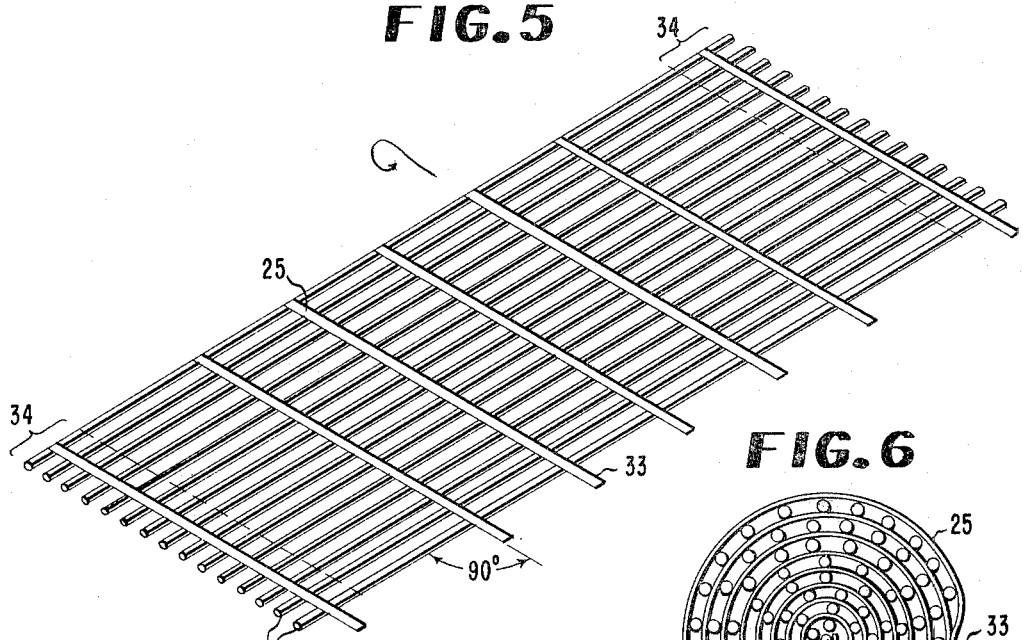
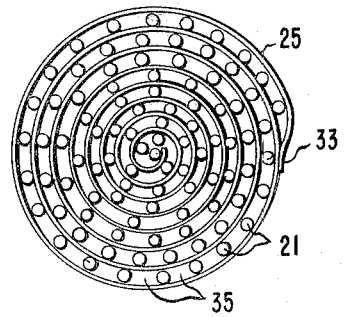
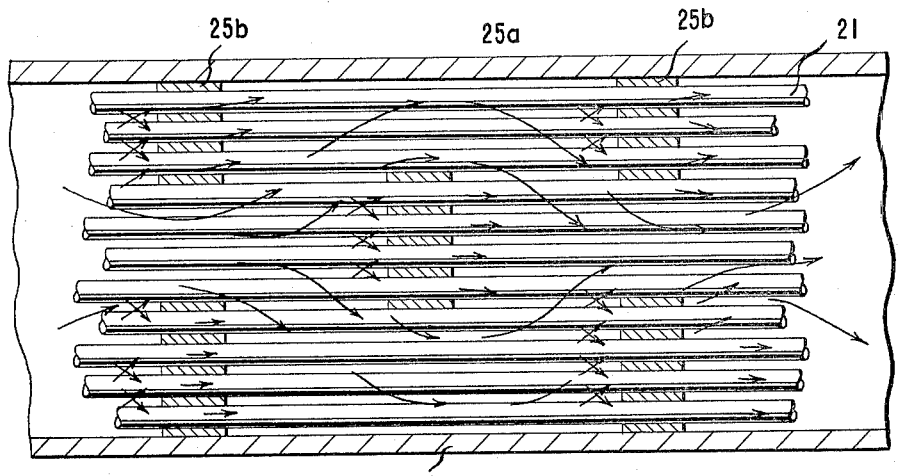
INVENTOR
MICHAEL S. WITHERS

Oct. 11, 1966 M. S. WITHERS 3,277,959
PLASTIC TUBE HEAT EXCHANGER AND PROCESS OF MAKING
Filed Aug. 12, 1964 5 Sheets-Sheet 4
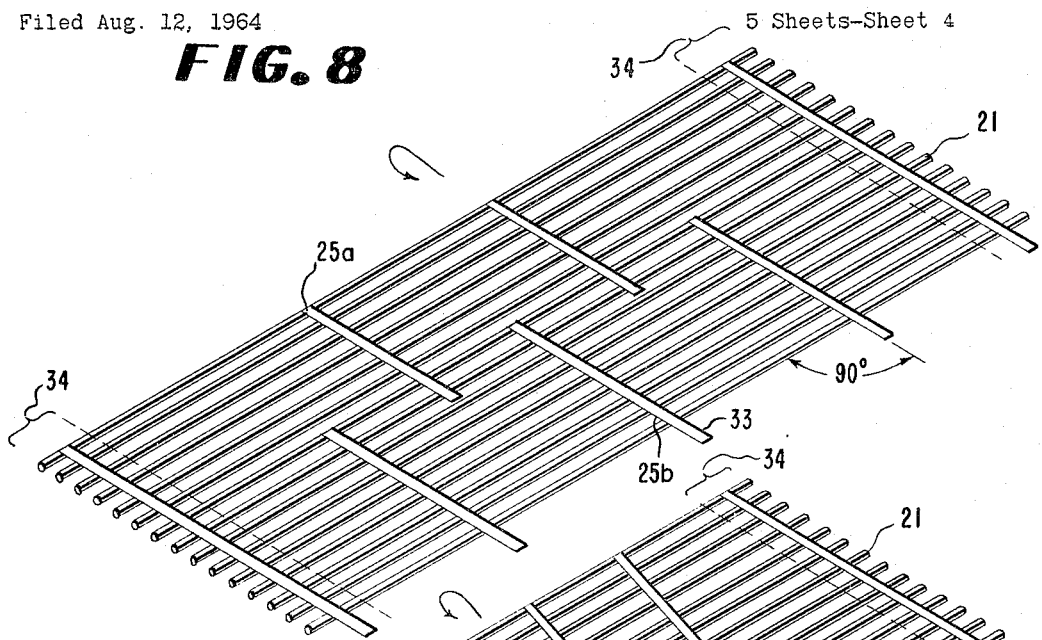
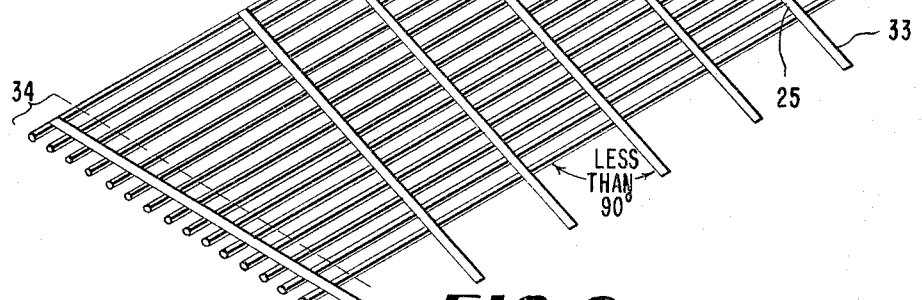
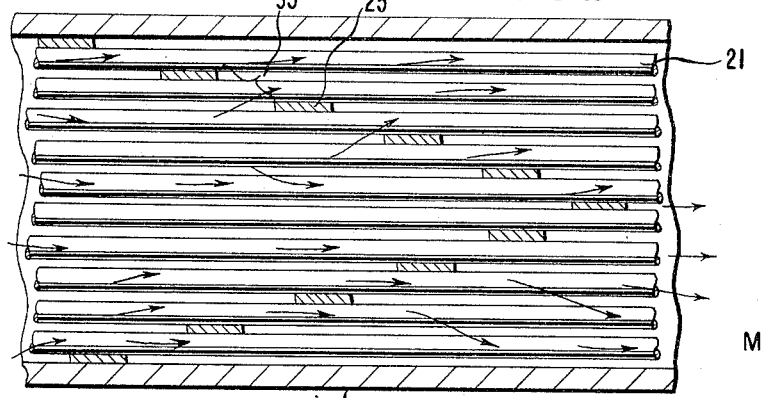
INVENTOR
MICHAEL S. WITHERS
BY *Herbert M. Wolfson*
ATTORNEY

INVENTOR
MICHAEL S. WITHERS

United States Patent Office 3,277,959
Patented Oct. 11, 1966

3,277,959
PLASTIC TUBE HEAT EXCHANGER AND
PROCESS OF MAKING
Michael S. Withers, Wilmington, Del., assignor to E. I. du Pont de Nemours and Company, Wilmington, Del., a corporation of Delaware
Filed Aug. 12, 1964, Ser. No. 389,109
12 Claims. (Cl. 165—159)

This invention relates to heat exchangers and, more particularly, to an improved heat exchanger of a shell and tube type and a process for preparing it.

There are numerous industrial operations which require apparatus for transferring heat between fluid masses wherein at least one of the fluids is corrosive. Such operations include the cooling of hot corrosive acids, the use of polluted river water or brackish sea water for cooling where an adequate supply of good water is not available, the rapid heating or cooling of food stuffs, etc.

The use of plastic tubes in a tube and shell heat exchanger for such operations would seem to be a logical possibility. However, because such materials possess inherently low thermal conductivities, they must be used as small-diameter, thin-walled tubes. Such tubes are flexible and tend to be extremely sensitive to changes in temperature. Attempts to fabricate successfully such tubes into a heat exchanger has been, heretofore, a virtually insurmountable task.

The object of the present invention is to provide a process for converting tubular plastic materials, such as the polymers of fluorocarbons, amides, acetals, olefins, vinyl halides, styrene, etc., into novel tube and shell heat exchangers. A further object is to provide a heat exchanger that is compact, lightweight, yet has a heat-transfer capacity comparable to an all-metal tube and shell heat exchanger. Other objects will appear hereinafter.

The objects are accomplished by first forming a tube bundle in a novel, commercially attractive fashion and then processing the ends of the tube bundle into a fluid-tight structure. Specifically, the tube bundle may be prepared by first forming a flat warp of substantially parallel hollow filaments by using a multi-end creel holding spools of the hollow filaments; unwinding the filaments from the spools and passing them through a gathering device to form a relatively close-packed warp of substantially parallel filaments; thereafter, unwinding a plurality of spacer tapes in a direction substantially perpendicular to the length of the filaments over the surface of the filaments and bonding the tapes to the surface of the filaments; cutting the filaments and, optionally, cutting the tapes, the length of the tapes extending beyond the outermost or edge filament. However, if a greater number of filaments are desired for the tube bundle, then after applying the tapes to the first set of filaments and cutting the filaments, this set of filaments is moved sideways (in the direction of tape unwinding) and a second set of substantially parallel filaments are unwound from the spools and placed adjacent the first set of filaments; the spacer tapes are further unwound and bonded to the second set of filaments; the filaments are cut, etc. When the desired number of filaments are obtained, the spacer tapes are cut, the length of the tapes extending beyond the outermost or edge filament to leave a trailing tab. Thereafter, the tube bundle is formed from the warp by convolutely winding the tape and the filaments attached to the tape about an axis parallel to an edge filament: In order to retain the tube bundle in a substantially cylindrical form, the extended portions of the tape, the tabs, are attached to the preceding tape winding.

There are several methods for gathering the ends of the tube bundle into a fluid-tight arrangement. A rigid disc having openings to accommodate the hollow filaments of the tube bundle in a snug fit is one possibility. The use of an adhesive or a cement to gather the ends together in a fluid-tight arrangement is another possibility. However, a preferred method for forming this fluid-tight structure is the subject of my copending application Serial No. 425,507. This process involves placing the tube ends in a sleeve and heating the filaments from their interiors until the filaments are soft. Thereafter, a vacuum is applied to the exterior of the filaments whereby the filaments are consolidated and adhered to each other and to the sleeve, the individual filaments assuming a polygonal (hexagonal, pentagonal or rectangular) cross-section from their original circular cross-section. The usual final profile of the filaments is hexagonal, from which the term "honeycomb sealing" for this process has emerged.

The tube bundle with its annular sleeves encompassing the two ends in an appropriate fluid-tight structure is then inserted into a suitable shell. The resulting heat exchanger then comprises the following components: an elongated shell of substantially circular cross-section; an inlet adjacent one end of the shell and an outlet adjacent the other end of the shell; a bundle of elongated plastic tubes extending longitudinally within the shell; annular sleeves disposed and secured to the ends of the shell adapted to enclose the two ends of the tube bundle in a fluid-tight arrangement; a plurality of spaced continuous tapes bonded to each of the tubes of the bundle between the enclosed ends, at least one tape disposed as a substantial spiral emanating from the central tube and terminating about the outer, substantially circular layer of tubes, the tapes adapted to space the tubes from each other and to provide interstices for the passage of fluid from the inlet to the outlet of the shell.

This heat exchanger is lightweight, compact and has a large heat-transfer surface. The method of fabrication, i.e., the use of the longitudinal tapes, provides a simple means of spacing and aligning the tubes. The tapes do not interfere with the thermal expansion characteristics of the plastic tubes during operation and, in fact, provide shell side baffling with improved, more efficient heat transfer. The chemical inertness and the non-stick properties of the plastic tubes, particularly if a fluorocarbon polymer such as polytetrafluoroethylene or a copolymer of tetrafluoroethylene and hexafluoropropylene is used, serve to prevent fouling of the heat exchanger. Finally, even if replacement should become necessary, the tubular compact assembly is easily removed and replaced.

Such heat exchangers are particularly useful in the chemical, petroleum and dairy industries. They are also useful in refrigerators, space heaters, automobile heaters, automobile radiators, etc. In short, they are useful wherever lightness, compactness, corrosion resistance, etc. are desirable.

The invention will be more clearly understood by referring to the drawing in which:

FIGURE 2 is a schematic illustration of the shell and tube exchanger;

FIGURE 3 is a view, partly sectional, of one end of the heat exchanger;

FIGURE 5 is a layout view of the tube bundle as a warp sheet prior to coiling;

FIGURE 6 is a sectional end view of the tube bundle taken along 6—6 of FIGURE 1;

FIGURE 7 is a partial sectional view of the tube bundle in which the spacers or tapes have been staggered;

FIGURE 8 is a layout view of the tube bundle of FIGURE 7 as a warp sheet prior to coiling;

FIGURE 9 is a partial sectional view of a tube bundle in which the spacers or tapes may be parallel to each other but are not perpendicular to the axis of the tubes;

FIGURE 10 is a layout view of the tube bundle of FIGURE 9 as a warp sheet prior to coiling.

Figure 1:
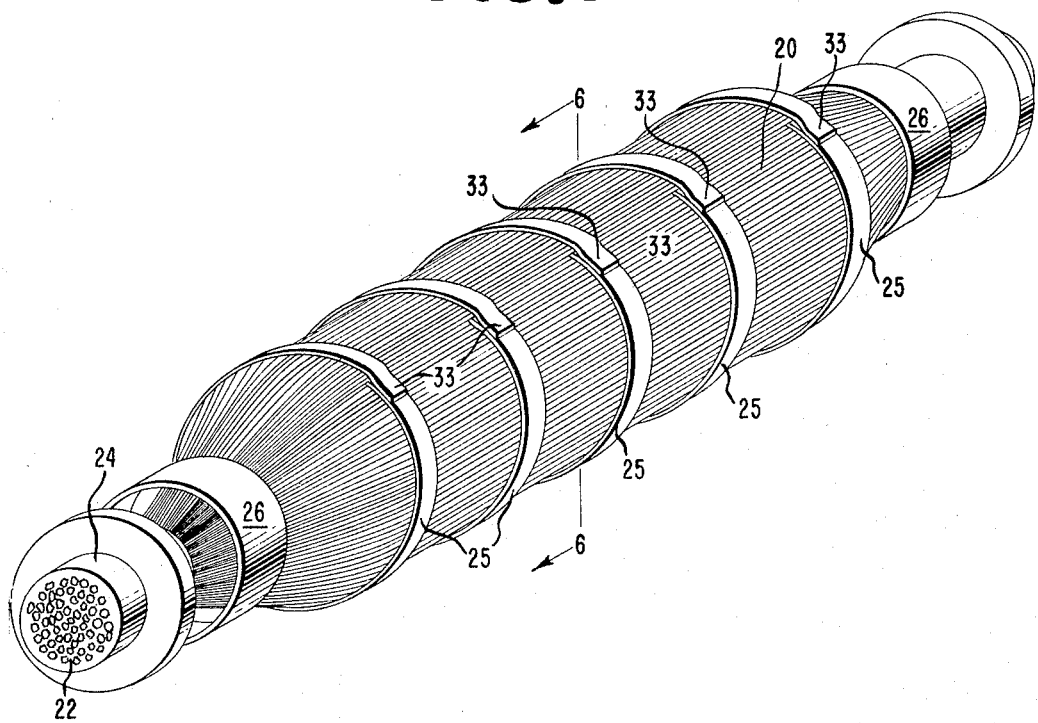
FIGURE 1 is a view, in perspective, of the tube bundle assembly.

Referring to FIGURES 2 and 3, the apparatus is composed of a cylindrical shell 11, preferably made of a stainless steel alloy, which is modified at either end by flanges 12 and 13 that are welded thereto and end caps 14 and 15. Flange 12 is provided with an outlet 16 and flange 13 with an inlet 17. These fittings are connected to suitable fluid conduits (not shown) through which one of the fluids circulates on the shell side of the apparatus. End cap 14 is likewise provided with an inlet 18 and cap 15, with outlet 19. These fittings serve to convey the other fluid through the apparatus on the tube side.

As shown in FIGURES 1 and 3, the apparatus contains internally an integral tube bundle 20 which is suitably attached to the shell 11 at either end. Bundle 20 is made up of a plurality of thin-walled, elongated tubes 21, preferably composed of a fluorocarbon polymeric material. The elongated tubes or hollow filaments may be anywhere from .08 inch to .25 inch in outside diameter with a wall thickness that is from 5 to 15% of the outside diameter. The bundle 20 may be prepared from a flat warp of parallel hollow polymeric filaments 21 having flat spacer tapes 25 hot air welded, bonded by adhesive or bonded by any method to the surfaces of the filaments in paths perpendicular to the axes of the filaments. The warp of evenly-spaced, parallel filaments, laid flat, is shown in FIGURE 5. It is tightly rolled or convolutely wound by hand or mechanically about an axis parallel to an edge filament with or without the use of a removable mandrel. In winding, the tapes are wound, preferably to be on the outside of the filament bundle, in pattern on themselves but separated in dimension by the diameter of the filaments to form the bundle 20. When coiling is completed, the trailing tape tabs or ends 33 are each welded or otherwise bonded to their preceding coils, thereby restraining the bundle of filaments in substantially cylindrical (cross-section) pattern.

Figure 11:
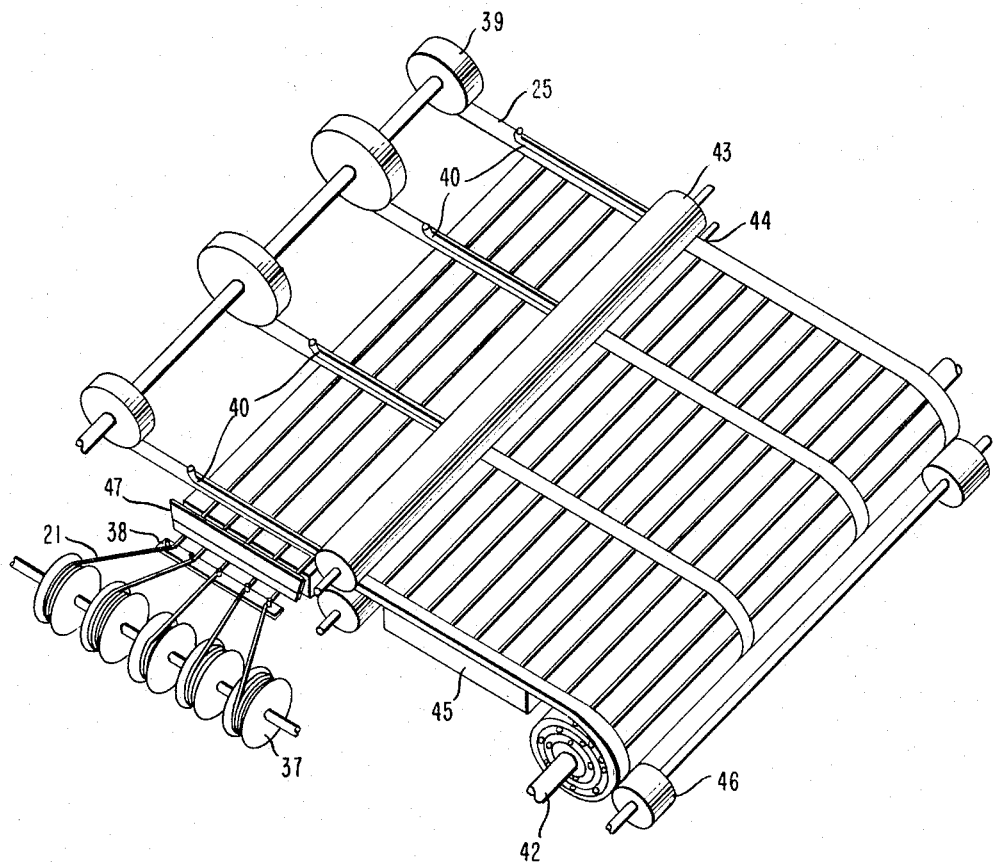
FIGURE 11 is a schematic illustration of an apparatus for forming the tube bundle.

One method for forming the warp is illustrated in FIGURE 11. In this method, a multiend creel holding spools 37 of the filaments is used. The filaments 21 are fed through gathering device 38 to provide a set of substantially parallel filaments having a preset length. Spacer tapes 25 are fed from spools 39 onto the surface of the filaments in a direction substantially perpendicular to the axes of the filaments. Pivoted welding bars 40 are brought into place over the tapes to bond the tapes to the surface of the filaments. Cutoff knife 41 then severs the filaments and the set of filaments is led into the nip of rotatable nip rolls 43 and 44, rotated by means not shown. The nip rolls serve to draw the set of filaments sideways onto a supporting plate 45 to permit a second set of filaments to be unwound from spools 37. The operation is intermittent but results in the production of a continuous web. When the desired number of filaments for the tube bundle are obtained, the spacer tapes 25 are severed in a manner to leave a trailing tab 33 and the web may be rolled up over a winding mandrel 42, rotated by means not shown. Guide rolls 46 serve to make a tight wrap. Alternatively, external wrapping rolls may be used to wind the bundle in "centerless" fashion.

Another method for forming the flat warp is the subject of U.S. patent application Serial No. 408,096 assigned to the assignee of the present application. This method involves winding at least one continuous hollow filament helically over the surface of a cylinder, the circumference of the cylinder being equal to the length of the warp and the number of turns of the helix being equal to the number of filaments desired in the warp; applying at least one length of tape to the filament helix, the length of tape being substantially parallel to the axis of the cylinder and preferably extending beyond the outermost portions of the helix; cutting the helix in a path substantially parallel to the axis of the cylinder and removing the tape and the filaments from the cylinder.

Still another method is the subject of U.S. patent application Serial No. 408,289 assigned to the assignee of the present application. In this method, the so-called transverse lacing method, a single continuous hollow filament is used. The filament is laced about two sets of substantially parallel spaced pins or the like. The two sets of pins are spaced from each other by a distance equal approximately to the desired length of the filaments in the ultimate bundle. The pins in each set are spaced from each other by a distance equal to two filament diameters and the diameter of each pin is equal to the pitch less two wall thicknesses of the hollow filament. The two sets of pins may be movable upon an endless mechanism to provide any number of hollow filaments for the warp or they may be stationary to provide a finite number of filaments per warp. After bonding the spacer tapes to the surface of the filaments in paths perpendicular to the direction or axes of the filaments, the loops of the filaments (which have been flattened by passage around the pins) are trimmed off and discarded. The resulting structure is the flat warp substantially as shown in FIGURE 5.

In the embodiment shown, each tube 21 may be approximately 0.100 inch in outside diameter with a wall thickness of about 0.010 inch. The ends of the bundle 20 are gathered and bonded together, preferably into a honeycomb structure, which is hereafter described as tube sheet 22. Tube sheet 22 may be encircled by a film-thick interliner or sheath 23 about 0.010 inch thick which is composed of material similar to the tubes 21. This sheath 23 is tightly bonded to the peripheral tubes 21 and to a collar or sleeve 24. Since a fluid tight seal must be made between the bundle 20 and the shell 11, it is desirable that sleeve 24 retain dimensional stability when subjected to elevated operating temperatures. Accordingly, sleeve 24 can be of a suitable corrosion resistant alloy, ceramic, phenolic or, as in the preferred embodiment, a copolymeric fluorocarbon which possesses a higher melting point than the tube material and exhibits excellent stability at elevated temperatures. It is noted that in the preferred case, regardless of the kind of material chosen, the sheath 23 may be interposed between the sleeve 24 and the tube bundle 20. Sheath 23 serves as an intermediary or transition piece which greatly facilitates a homogeneous, fluid-tight bond of the tubes 21 to sleeve 24. Between the tube sheets 22, tubes 21 are held apart on closely spaced centers by a series of narrow ribbon-like tapes or spacers 25. The tapes may be 0.005–0.035 inch thick and ⅛ to one inch wide. They may be made of any material that will withstand the conditions of operation, i.e., the temperature, the fluid used on the outside of the tube bundle, etc. Hence, although polymeric materials are preferred and specifically the polymers of fluorocarbons, amides, acetals, olefins, vinyl halides, styrene, etc., metals, textile materials and cellulosic materials may also be used.

Referring now more particularly to FIGURE 3, bundle 20 is shown assembled in the stainless steel shell 21. Only one end of the apparatus is shown and described to simplify the discussion. However, the opposite end is structurally and functionally identical. Bundle 20 is fixedly held in shell 11 by a locking collar 26 and a split metal locking ring 27 which resides in a groove 28 of collar 26. Ring 27 abuts the machined end face of the flange 12 and restrains bundle 20 from longitudinal displacement. It also permits easy removal and replacement of the bundle 20. An O ring gasket 29 forms a fluid-tight seal along the interface between the flange 12 and collar 26. Full constraint is applied against sleeve 24 through shoulder 30 by means of end cap 14. The clamping force is transmitted parallel to the axis of bundle 20 to locking collar 26 and ring 27. This permits maximum compression against the shoulder 30, thereby effecting a fluid seal along interface 31 with no danger of constricting the tube sheet 22. The clamping action of end cap 14 is applied through a plurality of hold down bolts 32.

As mentioned previously, tubes 21 are generally flexible and require supporting. Thus, referring to FIGURE 1, it will be seen that such support can be provided by the series of narrow ribbon-like tapes or spacers 25. These are preferably composed of the identical fluorocarbon material as the tubes 21 and may be about 0.010 inch thick and 3/8 to 1/2 inch wide. Tabs 33 are overlapped and bonded to the spacers 25 so as to hold the tube bundle 20 in place and thereby form a semirigid structure which is essentially self-supporting.

Figure 4:
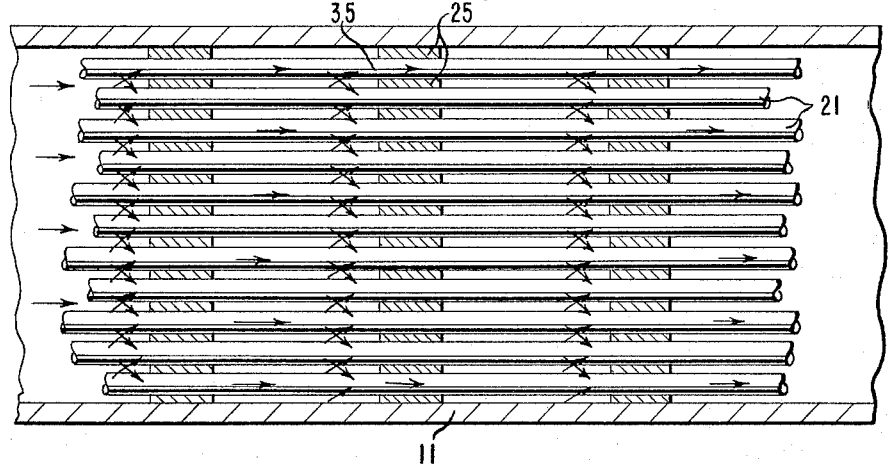
FIGURE 4 is a longitudinal section through a portion of the tube bundle.

In FIGURES 4, 5 and 6, the spacers 25 are shown as continuous ribbons that are spirally wound in overlapping layers with the tubes 21 evenly distributed between these layers. Each tube 21 is attached to the spacers 25 at one point (point of tangency) some predetermined pitch distance apart. Any suitable adhesive or solvent bonding technique may be employed; however, localized heat bonding is preferred. The criteria for selecting a proper pitch distance is based on producing a high density tubular bundle without sacrificing adequate, uniform interstices between the tubes for shell side fluid.

The following table illustrates typical bundle configurations:

| Tubes per Bundle | Tube O. Dia. (Ins.) | Pitch Distance (Ins.) | Warp Sheet Width (Ins.) | Coiled Bundle O. Dia. (Ins.) | Honey-comb Tube Sheet O. Dia. (Excluding Sleeve 24) | Heat Transfer Area (Sq. ft./ft.) |
|---|---|---|---|---|---|---|
| 1,000 | .100 | .120 | 120 | 4 | 3.47 | 26 |
| 500 | .100 | .120 | 60 | 2.82 | 2.47 | 13 |
| 250 | .100 | .120 | 30 | 2 | 1.81 | 6.5 |

Since the individual tubes 21 are attached to the spacers 25, the interstices or openings between neighboring tubes remain fixed. As best shown in FIGURE 6, these openings which hereafter are described as orifices 35 function as passages through which shell side fluid circulates. Because orifices 35 are evenly distributed through the bundle 20 cross-section, the fluid would be channeled uniformly. However, by careful selection of a spacer 25 arrangement, certain fluid flow distribution characteristics or flow path patterns can be established through the bundle so that the fluid is induced to follow flow paths that suit specific heat transfer conditions.

Accordingly, in FIGURES 7 and 8, a plurality of spacers 25a and 25b are bonded to a warp of parallel tubes 21 in a staggered relationship. When coiled, spacers 25a form the innermost spiral layers while spacers 25b form the outer spiral layers. Because spacers 25a and 25b alternate the length of the tube bundle 20, the shell side flow pattern is such that the fluid travels parallel along the tubes 21 and then zig-zags slightly between the spirals along paths of least resistance. This results in higher fluid turbulence and improved heat transfer. This configuration can also be produced by preparing two warps, the spacers in each warp being in a staggered relationship longitudinally. By convolutely winding one warp and using the resulting bundle as the core in the winding of the second warp, a configuration substantially as shown in FIGURE 7 will result.

It is recognized that in some situations which involve the passage of highly viscous fluids, extreme fouling or accelerated heat transfer rates, the orifices 35 may have to be enlarged. With the above-mentioned arrangements, the amount of obtainable increase is limited beyond which a further increase must be made at the expense of using fewer tubes per bundle and reduced number of supports.

In FIGURES 9 and 10, an alternate arrangement of spacers 25 is shown in which orifices 35 are enlarged significantly without sacrificing structural support or high tube density. This arrangement is best described by referring to FIGURE 10. In the figure, spacers 25 are shown affixed to the warp of parallel tubes 21 at an oblique angle less than 90°. In the assembled state, the spacers 25 form helical coils which contain elongated orifices 35. By applying the spacers 25 at increasingly shallow angles, the orifices 35 are correspondingly extended and enlarged.

In operation, one of the fluids is introduced on the shell side through inlet 17 and enters annular zone 36 and thence is circulated through the bundle 20. Depending on the particular spacer 25 arrangement, the fluid travels externally the full tube length. Because the tubes are attached at a single point, virtually the entire available surface of each tube remains exposed for heat transfer purposes, thereby reducing potential localized hot spots. The fluid ultimately enters disengaging zone 36 and exits through outlet 16 into a suitable process conduit (not shown). Conversely, the tube side fluid enters inlet 18 and travels a generally straight line flow path countercurrent to the shell side fluid and exits through outlet 19.

It will be noted that end areas 34 in FIGURES 5, 8 and 10 may be used to facilitate coiling the bundle and then may be cut off.

The following examples show typical operation compared to equivalent conventional metal tube apparatus.

*Example 1*

A heat exchanger is built with 360 tubes of a copolymer of tetrafluoroethylene and hexafluoropropylene. Each tube has an outside diameter of 0.080 inch and a wall thickness of 0.008 inch. This heat exchanger has a tube bundle 2.70 inches in diameter and 4 feet long and has a heat-transfer area of 30 square feet.

The equivalent metal heat exchanger of a similar geometric shape has 20 square feet of heat-transfer area. To provide this area, a metal tube bundle 5 inches in diameter and 2.75 feet long is required. Hence, the volume of the metal unit is 2.35 times the volume of the unit of the invention.

*Example 2*

Similarly, 100 square feet of exchanger area are provided with a bundle of 2500 plastic tubes 2.5 feet long, and 5 inches in diameter. The equivalent metal bundle (60 square feet of surface) would be 8 inches in diameter and nearly 2.5 feet long. The volume of the metal bundle is 2.15 times that of the bundle of the invention.

What is claimed is:

1. A heat exchanger comprising an elongated shell of circular cross-section; an inlet adjacent one end of said shell; an outlet adjacent the other end of said shell; a bundle of elongated plastic tubes extending longitudinally within said shell; annular sleeves disposed at and secured to the ends of said shell adapted to enclose the two ends of the tube bundle in a fluid-tight arrangement; a plurality of spaced continuous tapes bonded to each of said tubes between said enclosed ends, at least one of said tapes disposed as a substantial spiral emanating from the central tube and terminating about the outer substantially circular layer of tubes, said tapes adapted to space the tubes from each other and to provide interstices for the passage of fluid from said inlet to said outlet.

2. A heat exchanger comprising an elongated shell of circular cross-section; an inlet adjacent one end of said shell; an outlet adjacent the other end of said shell; a bundle of elongated plastic tubes extending longitudinally within said shell; annular sleeves disposed at and secured to the ends of said shell adapted to enclose the two ends of the tube bundle in a fluid-tight arrangement; a plurality of spaced continuous tapes bonded to said tubes between said enclosed ends; said tapes adapted to space the tubes from each other and to provide interstices for the passage of fluid from said inlet to said outlet.

3. An article of manufacture consisting essentially of a warp of a plurality of parallel, hollow, polymeric filaments and a plurality of spaced tapes disposed at an angle to said warp, said tapes bonded to said filaments of said warp and adapted to space said filaments from each other in a manner such that, upon convolutely winding said tapes about an edge filament as the axis, a tube bundle is formed wherein said tapes space said filaments from each other to provide interstices between said filaments.

4. An article as in claim 3 wherein at least one of said tapes is at an angle of 90° to said warp, has a length that is longer than the width of said warp, and is bonded to each filament of said warp.

5. An article as in claim 3 wherein all of said tapes are at an angle of 90° to said warp.

6. An article as in claim 3 wherein all of said tapes are at an angle of 90° to said warp and each tape is bonded to each filament of said warp.

7. An article as in claim 3 wherein said tapes are at an angle of less than 90° to said warp.

8. An article as in claim 3 wherein said tapes are at an angle of less than 90° to said warp and each tape is bonded to each filament of said warp.

9. An article as in claim 3 wherein said tapes are at an angle of 90° to said warp, the length of each tape being less than that necessary to bond to every filament, the tapes disposed in an alternating arrangement wherein a tape attached to one edge filament is adjacent a tape that is not attached to said edge filament but is attached to the other edge filament, the two edge filaments defining the width of said warp.

10. A process for preparing a tube bundle which comprises forming a warp of parallel, hollow, polymeric filaments, the width of said warp being defined by its two edge filaments; bonding a plurality of spaced tapes, at least one of which tapes is disposed at an angle of 90° to said warp, to the filaments of said warp, the length of the tape that is disposed at an angle of 90° to said warp being longer than the width of said warp to provide a trailing tab; convolutely winding said tapes about an edge filament as the axis; and bonding said trailing tab to the previous turn of said tape.

11. A process for preparing a heat exchanger which comprises first forming a flat warp of substantially parallel, hollow, plastic filaments, the width of said warp being defined by its two edge filaments; bonding a plurality of spaced tapes, at least one of which tapes is disposed at an angle of 90° to said warp, to the filaments of said warp, the length of the tape that is disposed at an angle of 90° to said warp being longer than the width of said warp to provide a trailing tab; and, thereafter, forming the tube bundle from said warp by convolutely winding said tape and said filaments attached thereto about an edge filament as the axis and bonding said trailing tab to a previous turn of said tape; gathering the ends of said tube bundle into a fluid-tight arrangement while maintaining the openings in said hollow filaments; placing said tube bundle within an elongated shell of circular cross-section in a manner such that the two gathered ends of the tube bundle fit snugly within the ends of said elongated shell, said shell having an inlet adjacent its one end and an outlet adjacent the other end, the inlet and outlet being inward from said gathered ends of the bundle.

12. A process for preparing a tube bundle which comprises the steps, in sequence, of forming a flat warp of substantially parallel, hollow filaments by unwinding a plurality of continuous, hollow, substantially parallel, plastic filaments to a predetermined length, said length defining the length of the bundle; unwinding a plurality of spaced tapes in a direction substantially perpendicular to the length of said filaments over the surface of said filaments; bonding said tapes to the surface of said filaments; cutting the filaments at said predetermined length to provide a first set of taped filaments; moving said first set of filaments sideways in the direction of tape unwinding; unwinding a second set of substantially parallel, hollow filaments; placing said second set adjacent the first set of filaments; further unwinding said spaced tapes; bonding said tapes to the surface of said second set of filaments; cutting the filaments of said second set at the same predetermined length as said first set of filaments; and, when the desired number of filaments are obtained, cutting the spaced tapes in a manner such that the length of said tapes extends beyond the outermost filament to leave a trailing tab; forming the tube bundle by convolutely winding said tapes and said filaments attached thereto about an edge filament as the axis; and gathering the ends of said tube bundle into a fluid-tight arrangement while maintaining the openings in said hollow filaments.

References Cited by the Examiner

UNITED STATES PATENTS 2,506,244 5/1950 Stopka _____ 165—10 X
2,753,435 7/1956 Jepson _____ 165—46 X

FOREIGN PATENTS 663,537 12/1951 Great Britain.

ROBERT A. O'LEARY, *Primary Examiner.*